United States Patent Office 3,408,263
Patented Oct. 29, 1968

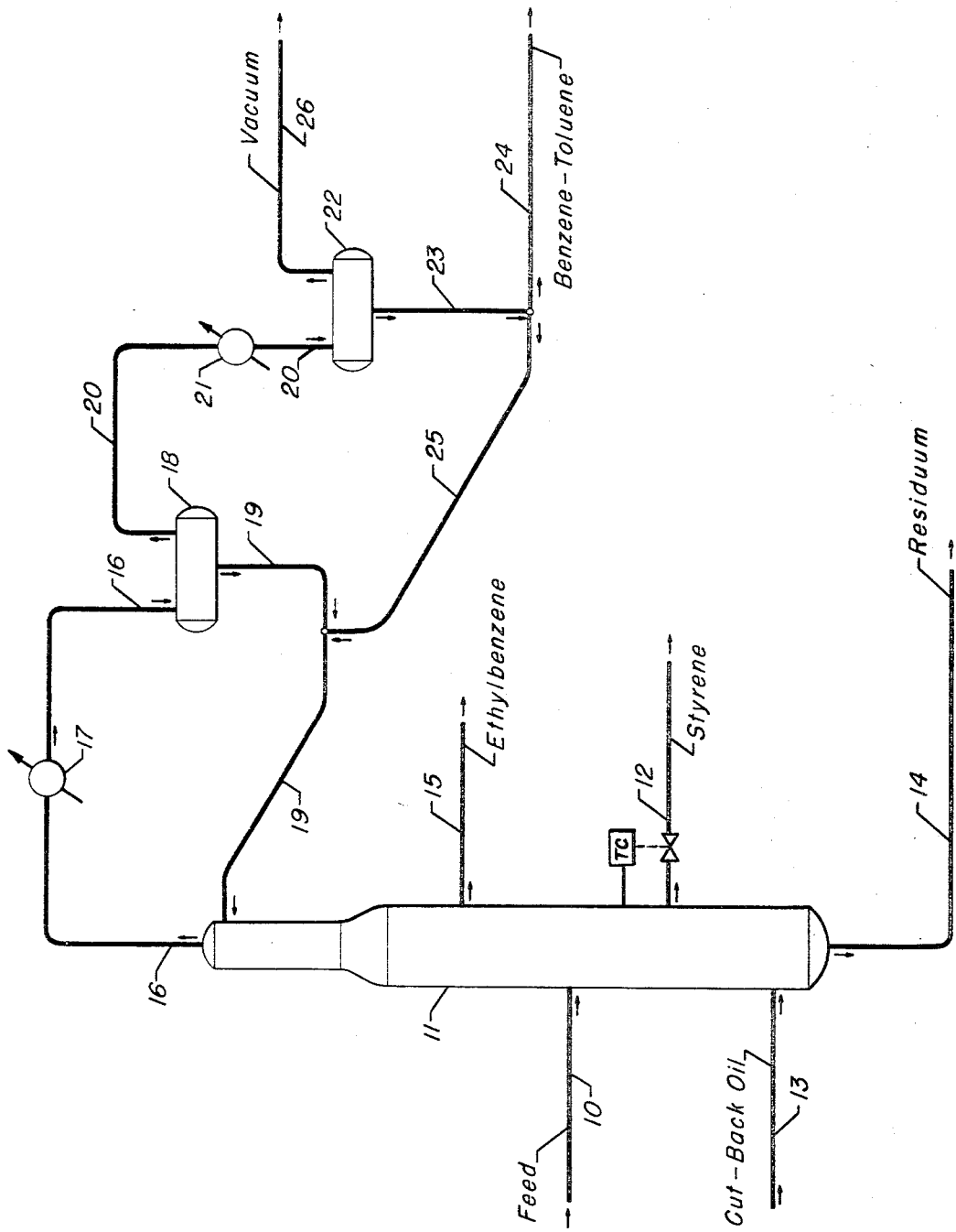

3,408,263
SINGLE COLUMN DISTILLATION OF MIXTURE OF AROMATICS CONTAINING STYRENE
Dennis J. Ward, Lombard, Ill., assignor to Universal Oil Products Company, Des Plaines, Ill., a corporation of Delaware
Filed Nov. 22, 1966, Ser. No. 596,140
10 Claims. (Cl. 203—2)

ABSTRACT OF THE DISCLOSURE

Method for distilling a mixture of ethylbenzene and styrene in a single distillation column having a column bottoms temperature exceeding 220° F. Styrene in a purity from 95% to 99% by weight is recovered from the column as a side-cut vapor fraction. Ethylbenzene in high purity is recovered as an overhead fraction. Cut-back oil is introduced into the bottom of the column to provide sufficient heat for distillation purposes and as a carrying medium for polymers and residuum which may be formed during the distillation of ethylbenzene from styrene.

---

This invention relates to a fractionation method. It particularly relates to a method for fractionating a feed mixture comprising benzene, toluene, ethylbenzene and styrene. It specifically relates to an improved method for recovering high purity styrene and a distillate stream comprising benzene and toluene from a feed mixture containing benzene, toluene, ethylbenzene and styrene via distillation means.

It is well known in the art that the various components contained in the effluent form, for example, an ethylbenzene dehydrogenation reaction zone may be separated by distillation means. These prior art processes include complicated multiple distillation trains typically wherein the benzene and toluene are removed in one fractionator, the ethylbenzene and styrene are separated from each other in another fractionation train, and the styrene is ultimately purified in a still additional distillation column, all operating under conditions which allegedly prevent styrene from significantly polymerizing itself by the sole application of heat. Normally, these various distillation trains are operated under sub-atmospheric pressure and under maximum temperature conditions which are significantly below the contemplated styrene polymerization temperature.

In copending patent application, Ser. No. 596,145 filed on even date herewith, there is disclosed a fractionation method whereby the various normally liquid components from the effluent of an ethylbenzene dehydrogenation reaction zone are separated in a single fractionation column with substantial economy of operation over these prior art processes. It would be desirable to further improve upon the single column distillation method disclosed in said copending patent application.

Accordingly, it is an object of this invention to provide an improved fractionation method.

It is another object of this invention to provide an improved fractionation method wherein the normally liquid components from the ethylbenzene dehydrogenation reaction effluent are separated in a single fractionation column.

It is a further object of this invention to provide an improved distillation process for the recovery of substantially pure styrene and a stream of substantially pure benzene and toluene from the effluent of an ethylbenzene dehydrogenation reaction zone.

According to the present invention, a method for fractionating a feed mixture comprising benzene, toluene, ethylbenzene and styrene comprises introducing said feed mixture into a single distillation column maintained under distillation conditions, withdrawing an overhead stream comprising ethylbenzene, withdrawing a bottoms fraction comprising styrene, partially condensing said overhead stream to produce a liquid fraction enriched in toluene and a gaseous fraction comprising benzene and toluene, returning said liquid fraction as reflux on the top section of said column, condensing said gaseous fraction, and recovering a liquid stream comprising benzene and toluene.

Another embodiment of the present invention includes a method for fractioning a feed mixture comprising benzene, toluene, ethylbenzene, and styrene comprising introducing said feed mixture into a single distillation column maintained under distillation conditions, withdrawing an overhead stream comprising benzene and toluene, withdrawing an upper side-cut fraction comprising ethylbenzene, withdrawing styrene as a lower side-cut vapor fraction, introducing relatively non-volatile hydrocarbons into said column, removing residuum including said non-volatile hydrocarbons from said column as a bottoms fraction, partially condensing said overhead stream to produce a liquid fraction enriched in toluene and a gaseous fraction comprising benzene and toluene, returning said liquid fraction as reflux on the top section of said column, condensing said gaseous fraction, and recovering a liquid fraction comprising benzene and toluene.

A specific embodiment of this invention includes a method for recovering high purity styrene and a distillate stream consisting of benzene and toluene from a feed mixture comprising benzene, toluene, ethylbenzene, and styrene, which comprises the steps of: (a) introducing said feed mixture at a temperature from 60° F. to 200° F. into a single distillation column having from 40 to 120 distillation trays therein; (b) withdrawing from said column an overhead stream comprising benzene and toluene at a temperature from 90° F. to 160° F. and a pressure from 60 to 180 mm. Hg absolute; (c) withdrawing from said column a side-cut fraction comprising ethylbenzene at a temperature from 120° F. to 200° F.; (d) withdrawing styrene as a side-cut vapor fraction at a rate responsive to a temperature in said column from 220° F. to 260° F.; (e) introducing a relatively heavy hydrocarbon stream into the bottom section of said column as cut-back oil; (f) withdrawing a bottoms fraction including at least part of said cut-back oil; (g) reboiling a portion of said bottoms fraction to maintain a temperature in the bottom section of said column from 230° F. to 300° F.; (h) partially condensing said overhead stream at a temperature from 70° F. to 120° F. to produce a liquid fraction enriched in toluene and a gaseous fraction comprising benzene and toluene; (i) returning said liquid fraction as reflux on the top section of said column; and (j) condensing said gaseous fraction to produce a liquid product stream consisting of benzene and toluene.

As noted from the above description, the present invention is based upon the discovery that benzene, toluene, ethylbenzene, and styrene could be separated from each other in a single distillation column utilizinz advantageously a unique overhead condensing system for the recovery of the benzene and toluene. The distillation conditions necessary to operate the single distillation column include a column design which contains from 40 to 120 distillation trays therein, and operating conditions including an overhead pressure from 60 to 180 mm. Hg absolute, an overhead temperature from 90° F. to 160° F., and a bottoms temperature from 230° F. to 300° F. It is to be noted that as used herein the term "bottoms temperature exceeding 230° F." is intended to include such minimum bottoms temperature without specifying a maximum operating temperature. Obviously, the maximum temperature will be that temperature below which substantial polymerization of styrene occurs. In many cases it may be advisable to operate at a relatively high bottoms temperature in order to recover benzene and toluene in substantially pure form while recovering styrene in substantially pure form, but the economics of the separation are such that small losses of styrene due to polymerization may be tolerated; in which event a higher bottoms temperature may be used than that for maximizing the production of styrene. In any event, the practice of this invention contemplates a bottoms temperature exceeding 230° F., but below that temperature at which styrene undergoes substantial heat polymerization.

The single distillation column not only contains the requisite number of distillation trays, but these trays should be designed so that there is no more than a 4 mm. Hg absolute pressure drop per tray and, preferably, is in the range from 2 to 3 mm. Hg absolute pressure drop across each tray. In similar manner, the single distillation column should be designed to minimize the residence time in the tower for the styrene component of the feed. Usually a residence time from 2 minutes to 40 minutes is satisfactory, although in some cases these limits may be exceeded without adversely effecting the desired separation. It is also desirable to exclude the presence of oxygen as a gas within the distillation column to any considerable extent. On the other hand, it is contemplated in the practice of this invention that certain styrene polymerization inhibitors be used. In some cases, and for some certain inhibitors, the presence of a small amount of oxygen may be necessary in order for the inhibitors to effectively prevent the polymerization of styrene. The present invention also contemplates the use of typical styrene polymerization inhibitors, such as sulfur, to maximize the production of styrene. The present invention will allow styrene to be produced in purities exceeding 95% by weight and a recovery of styrene exceeding 95% by weight. In many cases, both a purity in excess of 99% and a recovery of 98% to 99% may be afforded by the successful practice of the present invention.

With reference to the single distillation column of the present invention, the definitions of the overhead temperature and pressure and the bottoms temperature and pressure are intended to include the conventional methods of measuring these particular operating conditions. For example, the overhead temperature and pressure may be measured in the overhead vapor line leading from the distillation column. The bottoms temperature and pressure are also conventionally measured as the liquid temperature being removed from the bottom of the column and the pressure in the vapor space above this liquid level. However, other locations well known to those skilled in the art may be used with satisfactory results; for example, the bottoms temperature and pressure may be measured on the vapor line leading from a conventional reboiler system. Also, the overhead vapors leaving the distillation column may be compressed prior to condensation in order to keep the material above the freeze point of benzene. A conventional vacuum pump compressor may be used in this line for the production of the vacuum on the column and for increasing the pressure prior to the first condenser in order to control the freezing of the benzene. Those skilled in the art using the teachings presented herein will know how to properly design the overhead system in the column in order to maximize the production of the various components described herein.

The invention may be better understood with reference to the appended drawing which is a schematic representation of one embodiment of the present invention.

With reference to the drawing, a feed material comprising benzene, toluene, ethylbenzene, and styrene is passed into distillation column 11 via line 10. Single distillation column 11 contains from 40 to 120 distillation trays, typically about 80 trays having 2 to 3 mm. Hg absolute pressure drop per tray, and is operated at subatmospheric pressure, e.g., top=100 mm. Hg, bottom=260 mm. Hg, and a bottoms temperature, typically, exceeding 230° F. Styrene in high concentration is removed from distillation column 11 as a vapor stream at a rate responsive to a temperature in column 11 from 220° F. (shown as TC which activates the control valve) to 260° F. via line 12 as more fully discussed in said copending application Ser. No. 596,145. Similarly, cut-back oil to provide for liquid level in the bottom of the tower is added, in an amount from 0.05% to 1.0% of the feed, to column 11 via the line 13. Residuum containing, for example, the cut-back oil, tars, polymers, and the non-volatile styrene polymerization inhibitors, such as sulfur, is removed from column 11 via line 14. By means not shown, a portion of the material in line 14 is passed through conventional reboiler means to supply heat and vapors to distillation column 11 to effectuate the separation of the styrene from the bottoms product.

Ethylbenzene is removed from distillation column 11 at a temperature from 120° F. to 200° F., typically 180° F. via line 15 and is, preferably, recycled to the ethylbenzene dehydrogenation reaction zone which produced the feed material to the distillation column 11 discussed herein. The overhead vapor stream comprising benzene and toluene is removed via line 16 and preferably passed into compressor means not shown for increasing the pressure thereof from, typically, 100 to 800 mm. Hg absolute. The compressed vapors are passed into condensing means 17 wherein the material is partially at a temperature from 160° F. to 220° F., typically, from 180° F. to 200° F., condensed to produce a liquid fraction enriched in toluene, and a vapor fraction comprising benzene and toluene. The liquid is accumulated in settler vessel 18 and recycled as reflux to the top portion of distillation column 11 via line 19.

The vapor stream comprising benzene and toluene is removed from settler 18 via line 20 and passed into condensing means 21 which may be refrigerated in order to substantially, totally condense the benzene and toluene in line 20. The condensed material at a temperature from 60° F. to 120° F. is passed into settler 22 and the light gases and noncondensables are removed from the system via line 26 which, alternatively, may be used also for pulling a vacuum on the system where applicable. The liquid stream now consisting of benzene and toluene is removed from settler 22 and passed out of the process via lines 23 and 24. If desirable or needed, a portion of the benzene and toluene stream is passed via line 25 in admixture with the toluene-enriched stream in line 19 for reflux on the column at the top section thereof. Additionally, a portion of the ethylbenzene in line 15 may be cooled and returned to the column at an intermediate portion thereof as reflux therein.

It is to be noted from the practice of this invention that the overhead stream consisting of benzene and toluene is substantially pure in that it contains virtually no ethylbenzene, e.g., less than 1% by weight. Similarly, the material in line 12, as a vapor product, is substantially pure styrene in that it contains virtually no ethylbenzene, e.g., less than 0.5% by weight. On the other hand, the ethylbenzene may, in fact, contain significant quantities of toluene, e.g., up to 10% by weight. It was surprisingly found, however, that the presence of toluene in no way adversely effected the quality of the ethylbenzene for recycle purposes. Therefore, in the practice of this invention it is distinctly preferred that the ethylbenzene in line 15 containing significant quantities of toluene, be recycled to the ethylbenzene dehydrogenation reaction zone which, preferably, produced the feed material in line 10.

The cut-back oil added to distillation column 11 via line 13 may be conventionally any relatively heavy hydrocarbon oil. Typically, it is an aromatic hydrocarbon such as tetraethylbenzene which is suitable for this process.

The cut-back oil has been characterized as being relatively non-volatile, but it is to be understood that a small amount of vapors may be produced from the cut-back oil in order to provide for stripping of the styrene out of the bottoms product. Even though a small amount of the cut-back oil may be vaporized, the term "non-volatile hydrocarbon" is intended to include those materials which do slightly vaporize under the conditions of temperatures and pressures maintained in the bottom of distillation column 11. However, in no event should the cut-back oil have sufficient volatility to produce appreciable quantities of cut-back oil vapors as high up the column as the styrene draw-off vapor point designated in the drawing as line 12.

In a preferred embodiment of the invention, styrene in high concentration and high purity, typically 99% by weight styrene and 99% by weight recovery of styrene, is removed via line 12. It is to be noted that if sulfur has been used as the styrene polymerization inhibitor in the column, that no inhibitor will be present in the vapor stream in line 12. Accordingly, it may be desirable to include such an inhibitor, e.g., tertiary butylcatechol, in the condensed styrene product being passed to storage. Styrene in such high purity and concentration, of course, is of polymerization grade and may be polymerized to the well known plastic material.

The residuum material being removed via line 14 may be burned as fuel, if necessary, or may be further processed for recovery and recycle of the, for example, tetraethylbenzene.

The invention claimed:

1. Method for fractionating a feed mixture comprising benzene, toluene, ethylbenzene and styrene which comprises introducing said feed mixture into a single distillation column maintained under distillation conditions, withdrawing an overhead stream comprising benzene and toluene, withdrawing a side-cut fraction comprising ethylbenzene, withdrawing a bottoms fraction comprising styrene, partially condensing said overhead stream to produce a liquid fraction enriched in toluene and a gaseous fraction comprising benzene and toluene, returning said liquid fraction as reflux on the top section of said column, condensing said gaseous fraction, and recovering a liquid stream comprising benzene and toluene.

2. Method according to claim 1 wherein a portion of said side-cut fraction is returned as reflux on an intermediate section of said column and said distillation conditions include sub-atmospheric pressure and a bottoms temperature exceeding 220° F.

3. Method according to claim 1 wherein said column contains from 40 to 120 distillation trays and said distillation conditions include an overhead pressure from 60 to 180 mm. Hg absolute, an overhead temperature from 90° F. to 160° F., and a bottoms temperature from 220° F. to 260° F.

4. Method for fractionating a feed mixture comprising benzene, toluene, ethylbenzene, and styrene which comprises introducing said feed mixture into a single distillation column maintained under distillation conditions, withdrawing an overhead stream comprising benzene and toluene, withdrawing an upper side-cut fraction comprising ethylbenzene, withdrawing styrene as a lower side-cut vapor fraction, introducing relatively non-volatile hydrocarbons into said column, removing residuum including said non-volatile hydrocarbons from said column as a bottoms fraction, partially condensing said overhead stream to produce a liquid fraction enriched in toluene and a gaseous fraction comprising benzene and toluene, returning said liquid fraction as reflux on the top section of said column, condensing said gaseous fraction, and recovering a liquid stream comprising benzene and toluene.

5. Method according to claim 4 wherein a portion of said ethylbenzene side-cut fraction is returned as reflux on an intermediate section of said column and said distillation conditions include sub-atmospheric pressure and a bottoms temperature exceeding 220° F.

6. Method according to claim 4 wherein said column contains from 40 to 120 distillation trays and said distillation conditions include an overhead pressure from 60 to 180 mm. Hg absolute, an overhead temperature from 90° F. to 160° F., and a bottoms temperature from 220° F. to 260° F.

7. Method according to claim 4 wherein said upper side-cut vapor fraction is withdrawn at a temperature from 120° F. to 200° F.

8. Method for recovering high purity styrene and a distillate stream consisting of benzene and toluene from a feed mixture comprising benzene, toluene, ethylbenzene and styrene which comprises the steps of:
   (a) introducing said mixture at a temperature from 60° F. to 200° F. into a single distillation column having from 40 to 120 distillation trays therein;
   (b) withdrawing from said column an overhead stream comprising benzene and toluene at a temperature from 90° F. to 160° F. and a pressure from 60 to 180 mm. Hg absolute;
   (c) withdrawing from said column a side-cut fraction comprising ethylbenzene at a temperature from 120° F. to 200° F.;
   (d) withdrawing styrene as a side-cut vapor fraction at a rate responsive to a temperature in said column from 220° F. to 260° F.;
   (e) introducing a relatively heavy hydrocarbon stream into the bottom section of said column as cut-back oil;
   (f) withdrawing a bottoms fraction including at least part of said cut-back oil;
   (g) reboiling a portion of said bottoms fraction to maintain a temperature in the bottom section of said column from 230° F. to 300° F.
   (h) partially condensing said overhead stream at a temperature from 70° F. to 120° F. to produce a liquid fraction enriched in toluene and a gaseous fraction comprising benzene and toluene;
   (i) returning said liquid fraction as reflux on the top section of said column; and
   (j) condensing said gaseous fraction to produce a liquid product stream consisting of benzene and toluene.

9. Method according to claim 8 wherein a portion of said ethylbenzene side-cut fraction is returned to the column as reflux in an intermediate section of said column.

10. Method according to claim 9 wherein said portion of bottoms fraction is reboiled in the presence of a relatively non-volatile styrene polymerization inhibitor.

References Cited

UNITED STATES PATENTS

| | | | |
|---|---|---|---|
| 2,240,764 | 5/1941 | Dreisbach et al. | 203—9 |
| 2,336,493 | 12/1943 | Marks | 260—669 |
| 2,370,948 | 3/1945 | Gadura | 11—669 X |
| 2,411,106 | 11/1946 | Petry et al. | 260—669 |
| 2,556,030 | 6/1951 | Caulter et al. | 203—69 X |
| 2,557,684 | 6/1951 | Powers | 11—9 |
| 3,084,108 | 4/1963 | Randall | 260—669 |
| 3,209,044 | 9/1965 | Meek et al. | 11—669 |
| 3,219,721 | 11/1965 | Palmer et al. | 11—669 |

FOREIGN PATENTS 515,494   8/1955   Canada.

NORMAN YUDKOFF, *Primary Examiner.*

F. E. DRUMMOND, *Assistant Examiner.*